United States Patent [19]
Gamo et al.

[11] Patent Number: 4,843,203
[45] Date of Patent: Jun. 27, 1989

[54] TAPER CUTTING CONTROL METHOD AND CONTROL SYSTEM IN WIRE-CUT ELECTRIC DISCHARGE MACHINE

[75] Inventors: Gotaro Gamo; Mitsuo Kinoshita, both of Hachioji, Japan

[73] Assignee: Fanuc Ltd., Minamitsuru, Japan

[21] Appl. No.: 208,859

[22] Filed: Jun. 14, 1988

Related U.S. Application Data

[63] Continuation of Ser. No. 941,712, Dec. 9, 1986, abandoned, which is a continuation of Ser. No. 769,806, Aug. 27, 1985, abandoned, which is a continuation of Ser. No. 387,860, May 28, 1982, abandoned.

[30] Foreign Application Priority Data

Oct. 8, 1980 [JP] Japan ................... 55-141062

[51] Int. Cl.⁴ ............................................. B23H 7/06
[52] U.S. Cl. ............................ 219/69.12; 219/69.17
[58] Field of Search ............... 219/69 W, 69 M, 69 C; 204/206

[56] References Cited

U.S. PATENT DOCUMENTS

| | | | |
|---|---|---|---|
| 3,581,045 | 5/1971 | Panschow | 219/69 W |
| 3,731,044 | 5/1973 | Ullmann et al. | 219/69 W |
| 3,731,045 | 5/1973 | Ullmann et al. | 219/69 W |
| 3,849,624 | 11/1974 | Dulebohn et al. | 219/69 W |
| 3,946,189 | 3/1976 | Pomella et al. | 219/69 W |
| 4,314,133 | 2/1982 | Pfau et al. | 219/69 W |
| 4,355,223 | 10/1982 | Inoue et al. | 219/69 W |
| 4,363,948 | 12/1982 | Itoh | 219/69 W |

FOREIGN PATENT DOCUMENTS

| | | | |
|---|---|---|---|
| 55-77424 | 6/1980 | Japan . | |
| 120930 | 9/1980 | Japan . | |
| 56-39833 | 4/1981 | Japan | 219/69 W |

*Primary Examiner*—A. D. Pellinen
*Assistant Examiner*—Geoffrey S. Evans
*Attorney, Agent, or Firm*—Staas & Halsey

[57] ABSTRACT

To permit machining of a workpiece into a highly accurate tapered configuration, a wire-cutting EDM including a numerical controller that reads programmed shape data is utilized. To precisely taper the workpiece, it is necessary to move the upper and lower guides of the wire so that they start and stop moving simultaneously. From the programmed shape data, the respective speeds of the upper and lower guides are computed. The upper guid is interpolated by the upper guide speed, and the lower guide is interpolated by the lower guide speed so that the guides can start and stop moving simultaneously.

4 Claims, 6 Drawing Sheets

TAPER CUTTING CONTROL METHOD AND CONTROL SYSTEM IN WIRE-CUT ELECTRIC DISCHARGE MACHINE

This is a continuation of co-pending application Ser. No. 941,712, filed on Dec. 9, 1986, now abandoned, which is a continuation of Ser. No. 769,806, filed on Aug. 27, 1985, now abandoned, which is a continuation of Ser. No. 387,860, filed May 28, 1982, now abandoned.

BACKGROUND OF THE INVENTION

This invention relates to a taper cutting control method and system in a wire-cut electric discharge machine. More particularly, the invention relates to a taper cutting control method and system in a wire-cut electric discharge machine which enables the cutting speed at a predetermined taper-cut surface (a surface which is taper-cut by the electric machining of a workpiece through the intervention of a wire electrode) to be brought into coincidence with a commanded speed, and which, in the taper cutting operation, allows the movement of the upper and lower guides for guiding the wire electrode to be started simultaneously and ended simultaneously.

As is well-known in the art, a wire-cut electric discharge machine has a wire stretched between an upper guide and a lower guide and machines a workpiece by producing an electrical discharge between the wire and the workpiece. The workpiece, fixed on a table, is transported in X and Y directions along a machining contour in response to commands from a numerical control device.

Figure 1:
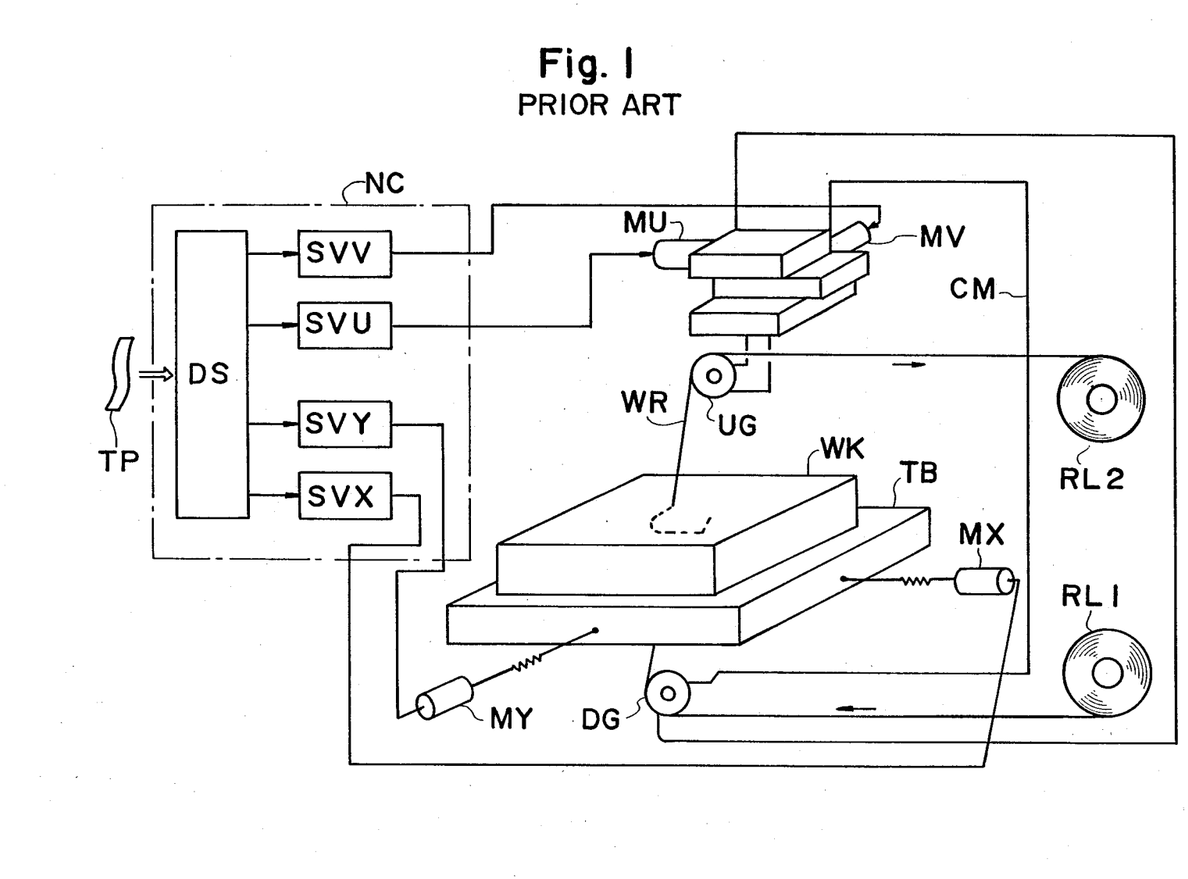
FIG. 1 is a simplified illustrative view for describing a wire-cut electric discharge machine to which the present invention can be applied.

Specifically, as shown in the simplified illustrative view of FIG. 1, which illustrates a well-known wire-cut electric discharge machine, a wire WR is taken up by a reel $RL_2$ and supplied with a voltage by a contacting electrode, not shown, while being payed out by a reel $RL_1$ and tensioned between the lower guide DG and upper guide UG. An electrical discharge is produced between the wire WR and the workpiece WK to cut the workpiece. The workpiece WK, meanwhile, since it is fixed on an X-Y table TB which is transported in the X and Y directions by motors MX, MY, can be cut into any profile by moving the table in the X and Y directions. Further, the arrangement is such that the upper guide UG is mounted on a moving mechanism that is transported in the X and Y directions by motors MU, MV, so that the upper guide UG also can be transported in the X and Y directions.

The above-mentioned moving mechanism, reels $RL_1$, $RL_2$ and lower guide DG are mounted on a column CM.

A numerical control device NC reads the contents of a command tape TP, executes distribution processing along each axis by means of distributing circuits DS in accordance with the commands, and drives motors MX, MY, MU, MV for each axis by means of driver circuits SVX, SVY, SVU, SVV corresponding to the respective axes to actuate the table TB and moving mechanism along a plane parallel to an X-Y plane to cut the workpiece WK into the desired profile.

With a four-axis control wire-cut electric discharge machine, the upper and lower surfaces of the workpiece are machined into profiles which are identical when the stretched wire is held normal to the table TB (workpiece WK). If the above-mentioned moving mechanism displaces the upper guide UG in the X and Y directions (referred to as the U- and V- axes) to incline the wire WR with respect to the workpiece WK such as by displacing the upper guide in a direction at right angles to the direction of workpiece movement, then the upper and lower surfaces of the workpiece WK will not be machined to the same profile. Instead, the surface machined by the wire will be inclined. This is so-called taper cutting.

Figure 2:
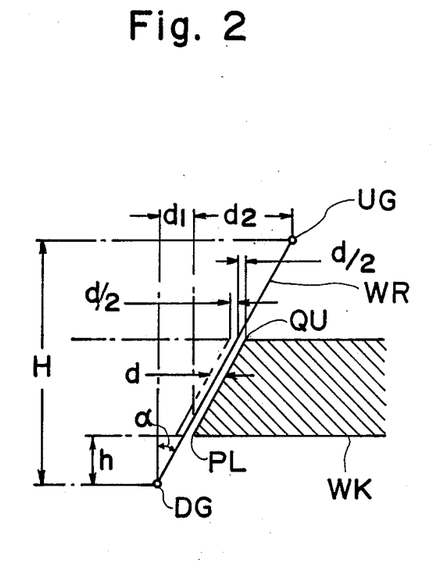
FIG. 2 is an illustrative view for describing taper cutting, which is the subject to which the present invention appertains.

FIG. 2 is an illustrative view of such taper cutting, in which a wire WR is stretched between an upper guide UG and a lower guide DG at a predetermined angle of inclination with respect to a workpiece WK. If we take the lower surface PL of the workpiece WK as the commanded program profile (the upper surface QU of the workpiece WK may also serve as a programmed profile), and if we let $\alpha$ denote the taper angle, H the vertical distance between a plane in which the upper guide UG is movable and a plane in which the lower guide DG is movable, and h the vertical distance between the plane in which the lower guide DG is movable and the lower surface of the workpiece WK, then the offset $d_1$ of the lower guide DG and the offset $d_2$ of the upper guide UG with respect to the lower surface PL of the workpiece, may be expressed:

$$d_1 = h \cdot \tan\alpha + \frac{d}{2} \qquad (1)$$

$$d_2 = H \cdot \tan\alpha - h \cdot \tan\alpha - \frac{d}{2} \qquad (2)$$

$$= H \cdot \tan\alpha - d_1$$

Note that d is the width of the cut.

Figure 3:
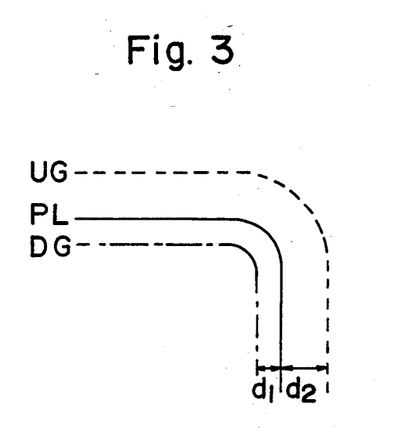
FIGS. 3 and 10 are illustrative views for describing examples of taper cutting.
Figure 10:
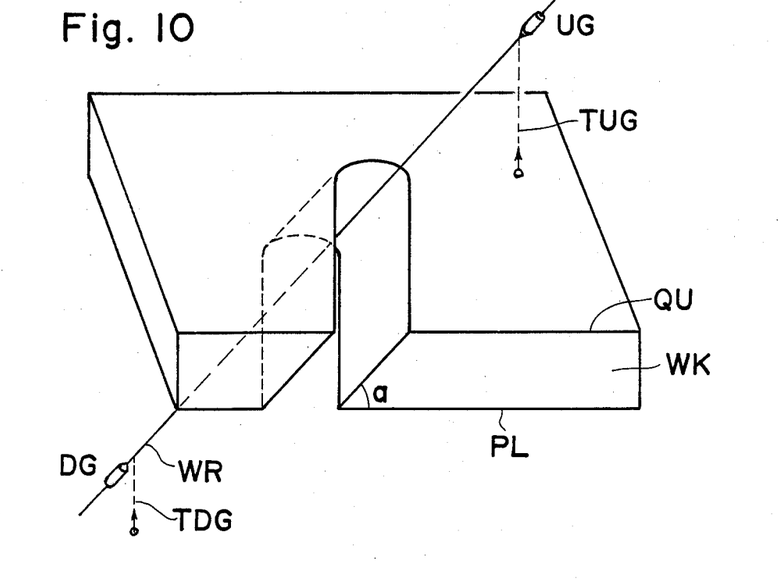

Thus, if movement of the upper guide UG from which the wire WR is stretched is so controlled in relation to workpiece movement that the offsets $d_1$, $d_2$ remain constant, then taper cutting at the taper angle $\alpha$ can be carried out, as shown in FIG. 3. The dashed line and one-dot chain line in the FIG. 3 indicate the paths of the upper and lower guides UG, DG, respectively. Designated in FIG. 10 at TUG is the path of movement of the upper guide, and TDG the path of movement of the lower guide.

In such taper cutting with a wire-cut electric discharge machine, cutting is performed in accordance with commands generally relating to programmed path data for the upper or lower surface of the workpiece (such as data for identifying end point coordinates, straight lines and circles), feed speed on the programmed path, taper angle, the distances H, h, etc. These commands are applied from a numerical control system to the wire-cut electric discharge machine.

With taper cutting, however, the distance from the cutting starting point to the end point generally is different along the upper and lower guide paths and on the cut surface. To cut a highly accurate tapered surface under such conditions, it is required that the cutting speed on the cut surface be brought into agreement with the commanded speed, and that the movement of the upper and lower guides start simultaneously and end simultaneously.

Conventionally, however, taper cutting is carried out by satisfying such requirements through an extremely complicated method.

Another numerical control system for controlling a travelling-wire electronic discharge machine is disclosed in U.S. Pat. No. 4,355,223. In this system, the pulses from the numerical controller are transmitted to pulse motors for driving the workpiece table along X and Y axes for generating the shape to be machined in the workpiece. A taper is applied to the cut by mounting one of the electrode wire guides on a subsidiary cross table capable of x and y movements through respective pulse distributors and sign-changing inverters from the numerical controller with respective pulse motors so that the cut on one side of the workpiece represents the sum of increments from both the X-Y and x-y displacements, while the cut on the opposite side represents substantially only the increments of the x-y displacements.

In this system, X-axis feed pulses and Y-axis feed pulses issued from the X- and Y-axis pulse distributors (interpolators) are applied to X- and Y-axis servomotors, respectively, to drive a main cross table which supports the workpiece thereon. At the same time, the products of the X- and Y-axis feed pulses and the ratio of the amount of feed TM by the main cross table to the amount of feed TS by the subsidiary cross table which moves one end of the wire electrode in x-y directions are used as feed pulses along x and y axes. Therefore, for linear interpolation, upper and lower machining lines on the workpiece are parallel as viewed in the direction of the z-axis.

This means that it is impossible to machine the workpiece along two machining lines which are not parallel to each other, i.e., along a twisted tapered surface.

For circular interpolation, upper and lower arcuate machining lines on the workpiece as viewed in the direction of the Z-axis must be concentric, and their angles of arc must be identical to each other.

In machining the workpiece along a path as shown in FIG. 7 of U.S. Pat. No. 4,355,223, when the guide on the subsidiary cross table reaches a point P along a line L1, the workpiece on the main cross table also reaches a point P' at the same time. After only the main cross table has moved from the point P' to a point P'', do the two cross tables proceed from the points P, P'' to points Q, Q'', respectively. After having reached the points Q, Q'', the main cross table remains at the point Q'', whereas the movable guide moves from the point Q to a point Q', after which both tables leave the points Q', Q'' for the direction of L2.

SUMMARY OF THE INVENTION

Accordingly, the object of the present invention is to provide a taper cutting control method and system in a wire-cut electric discharge machine which enable the cutting speed at a taper-cut surface to be brought into agreement with a commanded speed, and which allows the movement of the upper and lower guides to be started simultaneously and ended simultaneously, through a simple method and by means of a simple construction.

A further object of the present invention is to provide a taper cutting control method and system in a wire-cut electric discharge machine in which it is possible to achieve a highly accurate taper cutting operation in a simple manner.

Specifically, according to the present invention, distances of movement of the upper and lower guides and a machining distance on a predetermined plane of the workpiece are computed from the machining command, and the speeds at which the upper and lower guides should be moved to move the workpiece and the wire with respect to each other at the commanded speeds are found on the basis of the distances and commanded speeds of the workpiece and wire. This allows the workpiece and the wire to be moved at the commanded speeds and permits the movement of the upper and lower guides to be started and stopped simultaneously, making it possible to achieve highly accurate taper cutting.

The present invention provides a method and system for taper cutting such that a twisted tapered surface may be obtained on the workpiece, i.e., the two machining lines on the workpiece are not parallel.

DESCRIPTION OF THE PREFERRED EMBODIMENTS

An embodiment of the present invention will now be described in detail in conjunction with the drawings.

Figure 4:
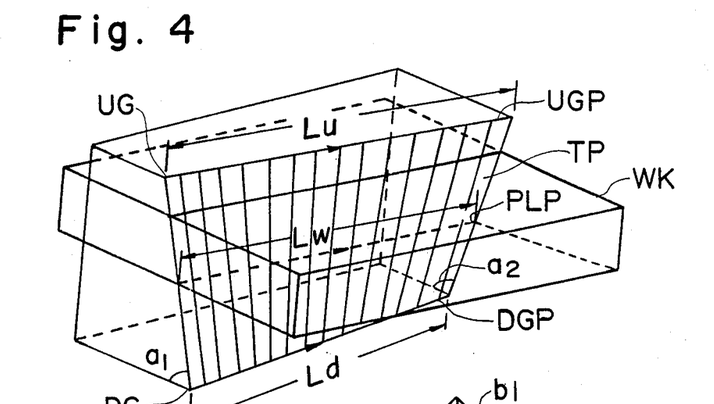
FIGS. 4 and 5 are perspective views showing tapered shapes to which the present invention appertains.
Figures 5, 6:
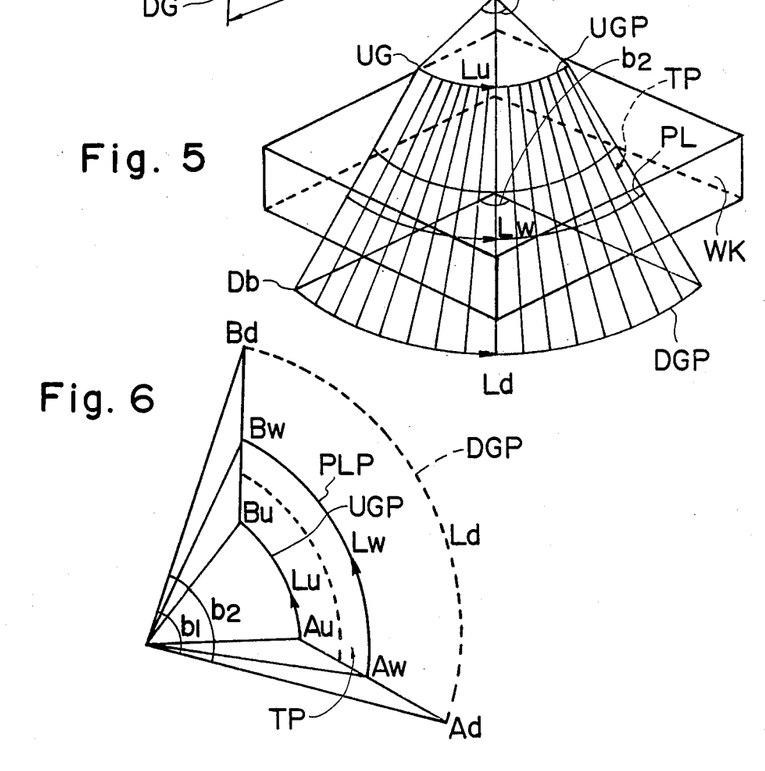
FIG. 6 is an illustrative view for describing a cutting control method embodying the present invention, which method is for the purpose of cutting the tapered shape of FIG. 5.

FIGS. 4 and 5 are perspective views of tapered shapes to which the present invention appertains. Both of the Figures show the distances (referred to as machining distances) from the cutting starting points to the cutting end points on the upper guide path, lower guide path and on the cut surface, these distances being different from one another. FIG. 4 is a perspective view showing linear machining, and FIG. 5 is a perspective view showing circular machining.

In the Figures, WK represents a workpiece, UGP the path of the upper guide UG, DGP the path of the lower guide DG, and PLP the programmed profile of the lower surface of the workpiece WK. In FIG. 4, the illustrated tapered shape has a taper angle $a_1$ at the cutting starting position, and a taper angle $a_2$ at the cutting end position, $a_1$ and $a_2$ differing from each other. A tapered surface TP whose taper angle varies gradually from $a_1$ to $a_2$ in continuous fashion is cut by continuously controlling the movement of the upper guide UG in accordance with the progress of the cutting work. The distance Lu of movement of the upper guide path UGP, the distance Ld of movement of the lower guide path DGP, and the machining distance Lw of the programmed path differ from each other.

FIG. 5 illustrates a tapered shape in which the programmed path is an arc, and the angle $b_1$ of arc of the upper guide path UGP and the angle $b_2$ of arc of the lower guide path DGP differ from each other. Also different from one another are the distance Lu of movement of the path UGP of the upper guide UG, the distance Ld of movement of the path DGP of the lower guide DG, and the machining distance Lw of the programmed path.

Described next will be the taper cutting method of the invention for a case where the tapered shape shown in FIG. 5 is to be cut.

FIG. 6 is a plan view of each of the paths and is useful in describing the present invention for a case where the tapered angle shown in FIG. 5 is to be cut. Portions which are the same as those shown in FIG. 5 are designated by like reference characters and are not described in detail.

In the FIG. 6, the arc $\overset{\frown}{A_w B_w}$ is the workpiece surface (programmed path PLP). The feed speed Fw along the arc $\overset{\frown}{A_w B_w}$ enters as a command from a separately provided paper tape or the like. The arc $\overset{\frown}{A_u B_u}$ is the path UGP of the upper guide UG, and the arc $\overset{\frown}{A_d B_d}$ is the path DGP of the lower guide DG. Aw and Bw are points predetermined during the design of the workpiece to be machined and are stored in the numerical control unit. The inclination angle a (see FIG. 2) is also predetermined. The heights Au and Ad are also predetermined by the positions of the upper and lower guides. Using a transformation by the angle a, it is possible to determine the coordinates of Bu and Bd. From the coordinates of the points and the angle a traversed, it is possible to calculate the length of the arcs Lu, Lw and Ld. Letting Lw, Lu, Ld be the distances on the programmed path PLP, the path UGP of the upper guide UG, and the path DGP of the lower guide DG, and letting t be the time required for movement from the cutting starting point Aw to the cutting end point Bw, the time t may be written:

$$t = Lw/Fw. \quad (3)$$

In order to start and terminate the movement of the upper guide UG and the movement of the workpiece WK relative to the wire WR at the same time (to simplify the explanation, it will be assumed hereinafter that the workpiece is fixed and that only the upper and lower guides are moved), the upper guide UG need only be moved from point Au to point Bu in time t and, likewise, the lower guide DG need only be moved from point Ad to point Bd in time t. Thus, if the upper guide UG is moved at speed Fu, given by the following equation:

$$Fu = Lu/t = \frac{Lu}{Lw} \cdot Fw \quad (4)$$

and the lower guide DG is moved at speed Fd:

$$Fd = \frac{Ld}{t} = \frac{Ld}{Lw} \cdot Fw \quad (5)$$

then the movement of the upper guide UG and the movement of the workpiece WE relative to the wire WR (movement of the lower guide DG) will end simultaneously.

Accordingly, the movement of the upper guide UG and lower guide DG may be started simultaneously and ended simultaneously by providing independent circular interpolators for moving the upper and lower guides, computing the distances Lw, Lu, Ld from the programmed shape data, then computing the feed speeds of the upper and lower guides UG, DG from equations (4) and (5), and finally executing an interpolation from point Au to point Bu by the circular interpolator for the upper guide, and simultaneously from point Ad to point Bd by the circular interpolator for the lower guide, in such a manner that the feed speeds are attained, the upper and lower guides UG, DG being moved by the interpolation pulses.

Figure 9:
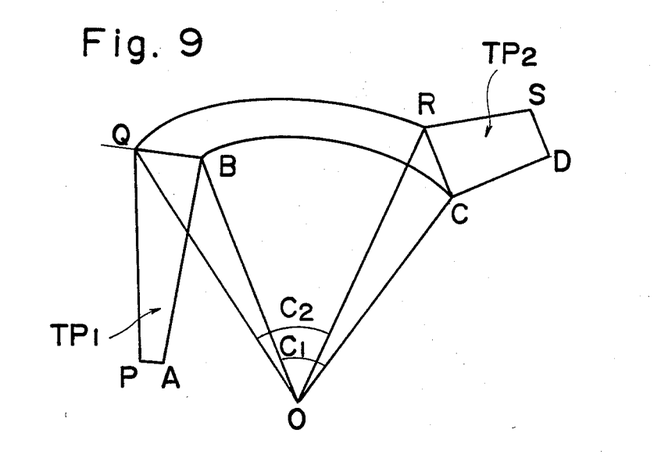
FIG. 9, is a diagram showing examples of machined paths possible by the present invention on a machined workpiece as viewed from the direction of the Z-axis.

As a result, a special electric discharge machining process as shown in FIG. 9 can be carried out according to the present invention.

FIG. 9 shows machined paths on a machined workpiece as viewed in the direction of the Z-axis. The machined path on the upper surface of the workpiece is represented by A-B-C-D, whereas the machined path on the lower surface of the workpiece is indicated by P-Q-R-S. The machined paths AB, PQ, CD, and QS are not parallel to each other as viewed in the direction of the Z-axis, providing twisted taper surfaces TP1 and TP2. The arcuate machined paths BC, QR have different lengths of arcs, and hence their angles of arc are different from each other.

For machining the workpiece to contour as shown in FIG. 9, the wire electrode starts moving from the points A and P simultaneously and reaches the points B and Q simultaneously. Then, the wire electrode starts moving along arcs toward the points C and R and reaches these points C and R simultaneously. The wire electrode thereafter moves toward the points D and S and arrives at these points D and S simultaneously, whereupon the electric discharging machining is completed.

According to the present invention, workpieces can be machined to such complex configurations, which could not be achieved by the apparatus and method disclosed in U.S. Pat. No. 4,355,223.

Figure 7:
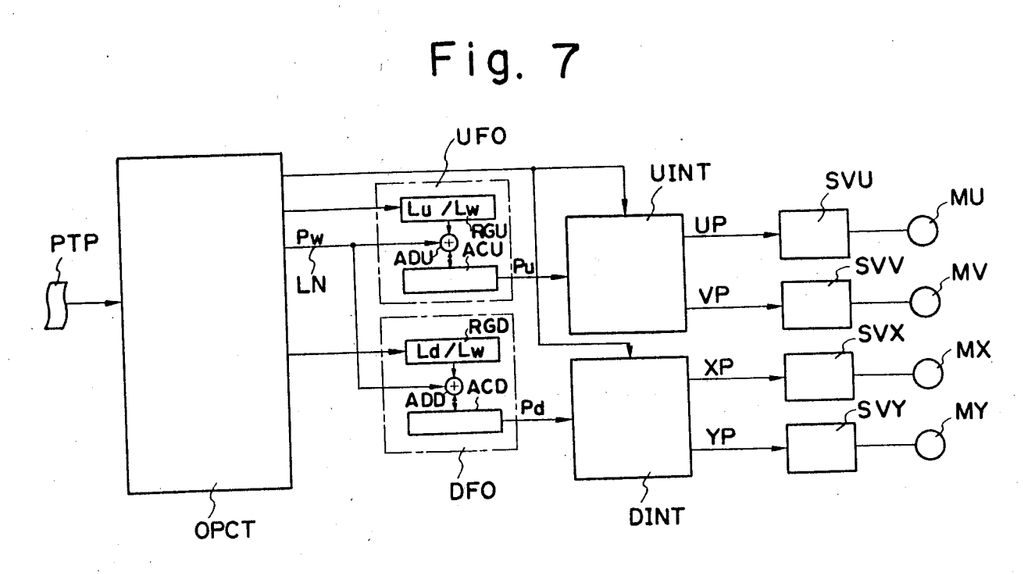
FIG. 7 is a circuit block diagram embodying the present invention.

FIG. 7 is a circuit block diagram illustrating an embodiment of the present invention. In the Figure, PTP denotes a paper tape in which are punched programmed path data (end point coordinates and circle radius), feed speed Fw, taper angle a, the distance H between the upper guide UG and lower guide DG, the vertical distance h between the lower surface of the workpiece WK and the lower guide DG, and the like. OPCT represents an arithmetic and control circuit for performing the following arithmetic and control operations (1) through (5):

(1) Using the commanded values from the paper tape, offset quantities are computed by performing the operations specified by Eqs. (1) and (2). Positional information (end point coordinates, circle radius etc.) concerning the paths of the upper and lower guides UG, DG is found from the offset quantities and from the programmed path data (end point, circle radius etc.).

(2) Lu/Lw and Ld/Lw are computed from each item of path data and from the path positional information, and output signals indicative of the results are produced.

(3) The items of positional information relating to the upper and lower guide paths computed in (1) are set in the interpolators for the upper and lower guides, to be described below.

(4) A pulse train of speed Fw is generated.

(5) Numerical control processing is carried out in addition to the foregoing operations.

The arithmetic and control circuit OPCT may be an arithmetic circuit and pulse generating circuit.

UFO, DFO represent feed speed arithmetic circuits for the upper and lower guides, respectively. Both circuits are arranged as linear interpolators of DDA-type (digital differential analyzer), and include respective registers RGU, RGD in which Lu/Lw and Ld/Lw, computed by the arithmetic and control circuit OPCT, are set or loaded, respectively, as well as accumulators ACU, ACD, and adders ADU, ADD. The adder ADU adds the contents of register RGU and the contents of accumulator ACU each time a pulse Pw of speed Fw is generated, and stores the result of the addition operation in the accumulator ACU. Likewise, the adder ADD adds the contents of register RGD and the content of accumulator ACD each time the pulse Pw of speed FW is generated, and sets the result of the addition operation in the accumulator ACD. If we assume that the accumulators have n-number of bits (a capacity of $2^n$), then the accumulators ACU, ACD generate the respective pulse trains Pu, Pd whose frequencies are given by:

$$\frac{Lu}{Lw} \cdot \frac{Fw}{2^n}, \frac{Ld}{Lw} \cdot \frac{Fw}{2^n}$$

respectively. Accordingly, if $2^n \cdot Lu/Lw$, $2^n \cdot Ld/Lw$ are set in the respective registers RGU, RGD instead of Lu/Lw, Ld/Lw, then the generated pulse trains Pu, Pd will have the frequencies Fu, Fd expressed by Eqs. (4), (5), respectively. UINT, DINT represent circular interpolators for the upper and lower guides, respectively. These may, for example, be arranged as well-known DDA-type circular interpolators. They are adapted to generate circular interpolation pulses UP, VP, XP, and YP. DVU, DVV, DVX, DVY represent servo control circuits for the upper guide (U-axis, V-axis) and for the lower guide (X-axis, Y-axis), respectively. MU, MV, MX, MY are servo motors for each of these axes.

The operation of FIG. 7 will now be described.

Figure 8:
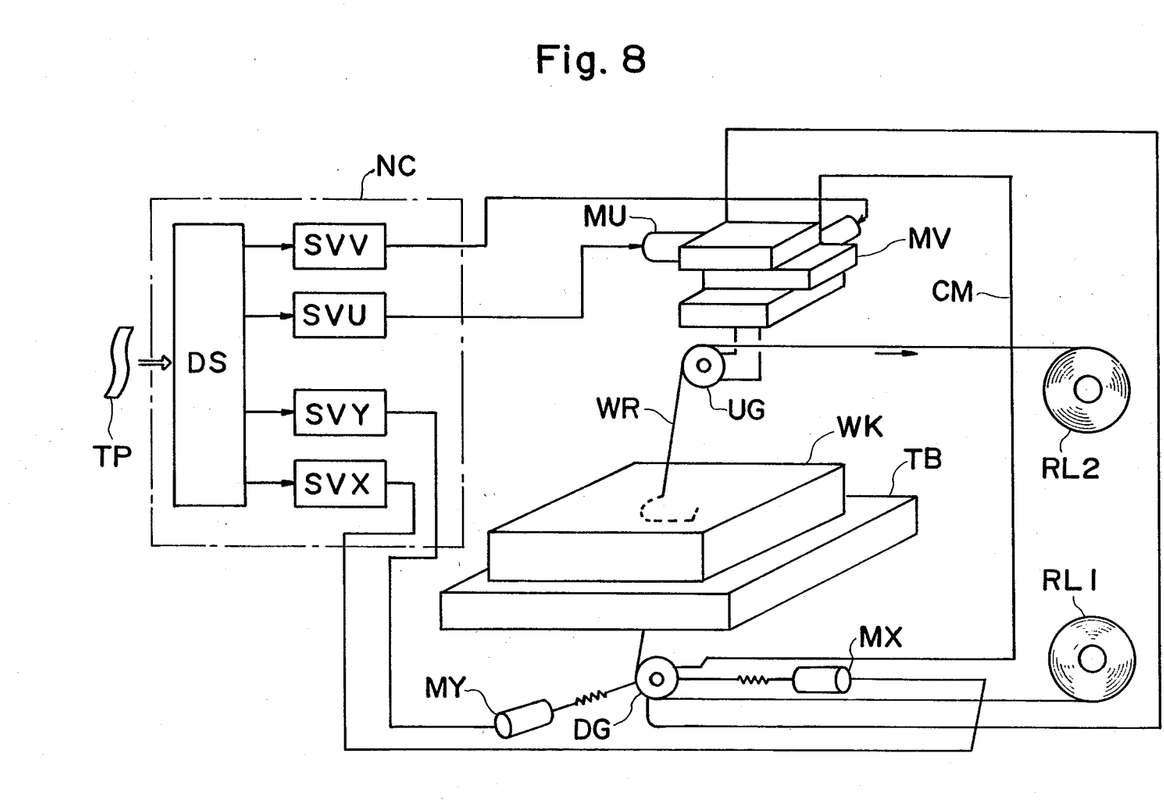
FIG. 8 provides a simplified illustrative view of a wire-cut electric discharge machine in accordance with the present invention.

When numerical control information relating to the tapered shape of FIG. 4 is read from the paper tape PTP, the arithmetic and control circuit OPCT executes the abovementioned operations (1) through (4), sets $2^n \cdot Lu/Lw$, $2^n \cdot Ld/Lw$ in the respective registers RGU, RGD, and generates the pulse train Pw of frequency Fw on line LN. As a result, the feed speed arithmetic circuits UFO, DFO for the upper and lower guides supply the interpolators UINT, DINT with pulse trains Pu, Pd of frequencies Fu, Fd, respectively. Since the positional information relating to the paths of the upper and lower guides, found from (1) above, has already been set in the interpolators UINT, DINT by the arithmetic and control circuit OPCT, the interpolator UINT for the upper guide executes interpolation along the arc $\widehat{AuBu}$ (FIG. 6), for example and the interpolator DINT for the lower guide simultaneously executes interpolation along the arc $\widehat{AdBd}$ (FIG. 6), for example each time the respective pulses Pu, Pd are generated. The interpolation pulses UP, VP, XP, YP generated by the interpolation operation are applied to the respective servo control circuit SVU, SVV, SVX, SVY. The servo control circuits, upon receiving these pulses, execute a well-known servo control operation to rotate the respective servo motors MU, MV, MX, MY, thereby moving the upper and lower guides as illustrated by the wire-cut electric discharge machine of FIG. 8. As a result, the upper and lower guides are moved along the arcs $\widehat{AuBu}$, $\widehat{AdBd}$ for example, and reach the arc end points Bu, Bd simultaneously where they are brought to a stop, also simultaneously.

To facilitate the description, it has been described above that the workpiece is fixed, while the upper and lower guides are moved by four-axis control. The present invention is not limited to a case where the workpiece is fixed, however, and can be applied to a situation where the movement of the upper guide and workpiece are controlled along four axes simultaneously. Also, in a computerized numerical control device which incorporates a well-known microcomputer, the operations of the feed speed arithmetic circuits UFO, DFO, interpolators UINT, DINT and arithmetic and control circuit OPCT, shown in FIG. 7, can be executed under the control of a program. According to the present invention, the cutting speed at a cut surface can be brought into agreement with a commanded speed, and the movement of the upper and lower guides can be started simultaneously and halted simultaneously, through a simple method. It is therefore possible to enhance the performance of the electric discharge machine and to perform cutting at a high level of accuracy.

What is claimed is:

1. A method of controlling a wire-cutting electric discharge machine for moving a workpiece relative to a wire electrode and moving upper and lower guides which support the wire electrode, relative to each other to machine a workpiece to generate a twisted taper surface according to a machining command, said method comprising the steps of:
   (a) computing offsets of the upper and lower guides from a machining path on a prescribed surface of the workpiece from a machining command applied from a numerical control system;
   (b) computing distances Lu and Ld of movement of the upper and lower guides from said computed offsets and a machining distance Lw along the machining path;
   (c) computing ratios Lu/Lw and Ld/Lw of said distances Lu and Ld of movement of the upper and lower guides to said machining distance Lw;
   (d) computing speeds Fu and Fd of movement of the upper and lower guides from a machining speed Fw on the prescribed surface of the workpiece and said ratios Lu/Lw and Ld/Lw according to the equations:

$Fu = (Lu/Lw) \times Fw,$ $Fd = (Ld/Lw) \times Fw;$ (e) interpolating the upper guide with said speed Fu of the movement of the upper guide, interpolating the lower guide with said speed Fd of movement of the lower guide, and simultaneously starting the moving of the upper and lower guides; and
   (f) performing steps (a) through (e) a plurality of times.

2. A system for controlling a wire-cutting electric discharge machine for moving a workpiece relative to a wire electrode and moving upper and lower guides which support the wire electrode, relative to each other, to machine a workpiece to generate a twisted taper surface according to a machining command, said system comprising:
   (a) means for computing distances Lu and Ld of the upper and lower guides, respectively, and a machining distance Lw on a commanded prescribed surface of the workpiece from positional information contained in the machining command;

(b) means for computing ratios Lu/Lw and Ld/Lw of said distances Lu and Ld of movement of the upper and lower guides to the machining distance Lw;

(c) means for computing speeds Fu and Fd of movement of the upper and lower guides, respectively, by multiplying a relative speed Fw of movement between the workpiece and the wire electrode on the prescribed surface by said ratios Lu/Lw and Ld/Lw;

(d) interpolating means for generating interpolation pulses to drive said upper and lower guides based on the speeds Fu and Fd of movement of the upper and lower guides and the positional information contained in the machining command; and (e) upper and lower guide driving means driveable by the interpolation pulses generated by said interpolating means for simultaneously starting said upper and lower guides and simultaneously stopping said upper and lower guides.

3. A system according to claim 2, wherein said interpolating means comprises circular interpolators.

4. A system according to claim 2, wherein said interpolating means comprises linear interpolators.

* * * * *

UNITED STATES PATENT AND TRADEMARK OFFICE
CERTIFICATE OF CORRECTION

PATENT NO.   :   4,843,203
DATED        :   JUNE 27, 1989
INVENTOR(S)  :   GOTARO GAMO ET AL.

It is certified that error appears in the above-identified patent and that said Letters Patent is hereby corrected as shown below:

FRONT PAGE [73] Assignee:  "Fanuc Ltd.," should be --Fanuc Ltd,--;

[57] ABSTRACT, line 9, "guid" should be --guide--.

Signed and Sealed this

Tenth Day of April, 1990

Attest:

HARRY F. MANBECK, JR.

*Attesting Officer*            *Commissioner of Patents and Trademarks*